United States Patent [19]

Shtipelman et al.

[11] Patent Number: 4,673,197
[45] Date of Patent: Jun. 16, 1987

[54] MAP DISPLAY APPARATUS AND METHOD

[76] Inventors: Manya Shtipelman; Boris A. Shtipelman, both of 35 Shirewood Dr., Rochester, N.Y. 14625

[21] Appl. No.: 889,432

[22] Filed: Jul. 25, 1986

[51] Int. Cl.⁴ .................. G09B 29/00; G09B 29/04; G09B 29/10; G09F 7/00

[52] U.S. Cl. .................................. 283/34; 40/904; 434/150; 434/153

[58] Field of Search ................. 283/34, 48 R, 49, 50; 273/157 R; 434/130, 150, 152, 153; 40/904

[56] References Cited

U.S. PATENT DOCUMENTS

| | | | |
|---|---|---|---|
| 1,537,634 | 5/1925 | Watson | 434/150 |
| 1,541,899 | 6/1925 | Chapman | 283/34 |
| 1,591,865 | 7/1926 | Wagner | 283/34 |
| 1,643,831 | 9/1927 | Bowman | 434/150 |
| 2,789,372 | 4/1957 | Ribak | 434/153 |
| 2,953,380 | 9/1960 | Hassenbach | 434/150 |
| 3,248,806 | 5/1966 | Schrader | 434/150 |
| 4,030,218 | 6/1977 | Stockwell | 283/34 |

Primary Examiner—E. R. Kazenske
Assistant Examiner—Paul M. Heyrana, Sr.
Attorney, Agent, or Firm—Martin LuKacher

[57] ABSTRACT

Map display apparatus for travelers and drivers presenting geographical regions (the world, continents, countries, states, cities, etc.) as a combination of sequential zones illustrated on pocket size cards with each zone repeated four times for North, East, West, and South (N E W S) orientation. It is supplemented by a set of accessories for tracing directions in an erasable or washable form with a provision for card's multiple usage and a portable holder for their storage.

13 Claims, 12 Drawing Figures

MAP DISPLAY APPARATUS AND METHOD

FIELD OF THE INVENTION

The invention relates to apparatus for the organization and display of road maps and particularly map display apparatus having sets of maps for each geographical region wherein the regions are presented in four views for north, east, west, and south orientation as desired depending upon the user's direction of travel with an allowance for an erasable or washable tracing of route directions.

DESCRIPTION OF THE PRIOR ART

Establishing directions to go from one place to another has been done in the past by using road maps, as well as different types of atlases and map books. In general, each map represents a certain geographical region and is designed as a separate unit, either multifolded for ease of storage or bound together with other maps.

Typically, a number of maps is required for long trips. Depending upon the traveling distance, one has to switch along the way from one map to another, or skip through different pages of a road atlas when the maps are bound together. This presents a major discomfort and, even worse, a safety hazard for a car driver unless a stop is made to study trip directions. Furthermore, unfolding and folding a large map to define the correct location on the road may become a monumental task by itself.

In some instances, the above mentioned problems may be partially eased by making up in advance a special booklet containing local regional maps for one-of-a-kind trip assembled together in correct sequence. This preparatory work, for example, is conducted by the American Automobile Association wherefrom its members may obtain such booklets (called "triptics") with desired traveling directions traced in a distinquishing color.

One problem, however, is typical for all forms of road maps. It is related to the fact that the top of almost any map is directed toward the north. As a result, when traveling in a direction other than north, there is a mismatch between direction of the driver's motion and road orientation on the map. For instance, if going south, a right hand turn from the main road has to be made in order to proceed along a side road going west. However, that road exits from the main road on its left hand side if the map is viewed in a normal fashion. This, of course, may be corrected by turning the map upside down. As a consequence, all map signs and indications will appear in a turned-up way when their reading becomes inconvenient or totally impossible.

OBJECT AND SUMMARY OF THE INVENTION

It is a general object of the invention to provide map display apparatus having sets of cards. Each set is for a separate zone of a large geographical region (countries, states, cities, etc.). Each set contains four cards repeating the map of the zone four times—for north, east, west, and south orientation. The cards are called N E W S Map ™ cards. The cards are preferrable folded centrally along a fold line to provide four panels, each with a different map. Depending upon the direction of travel, a particular map of the four can be located face up and arranged with similarly located panels for different zones along the route, one on top of the other. The sets are supplemented by a number of accessories which allow the tracing of desired traveling directions on the map with erasable or washable markings resulting in a multiple utilization of each card. An ergonomic storage box is provided for a group or deck of the cards arranged for a selected route. Transparent plastic envelopes for each set in which the folded card may be placed are also included for convenience and safety of map usage during driving.

The present invention, therefore, provides a new style and lay-out in map design and display wherein a geographical region is divided into separate zones, maps of which in different orientation are presented on individual cards. Each card illustrates a certain portion of the region repeated in four views for road orientation in the north, east, west, and south directions. A transparent wrapping sheet of plastic over the card surfaces may be incorporated to permit tracing of desired trips with erasable or washable markers. For such trips, required map panels are marked in advance for road directions and assembled together in correct sequence as a deck of cards. Their utilization during driving is assured to be convenient and safe by providing special transparent multiple-use plastic envelopes and an ergonomic storage box.

DESCRIPTION OF THE DRAWINGS

FIG. 2 in FIGS. 2 A,B, and C represents two views of opposite sides and an end view of a card.

DESCRIPTION OF THE PREFERRED EMBODIMENT

Figure 1:
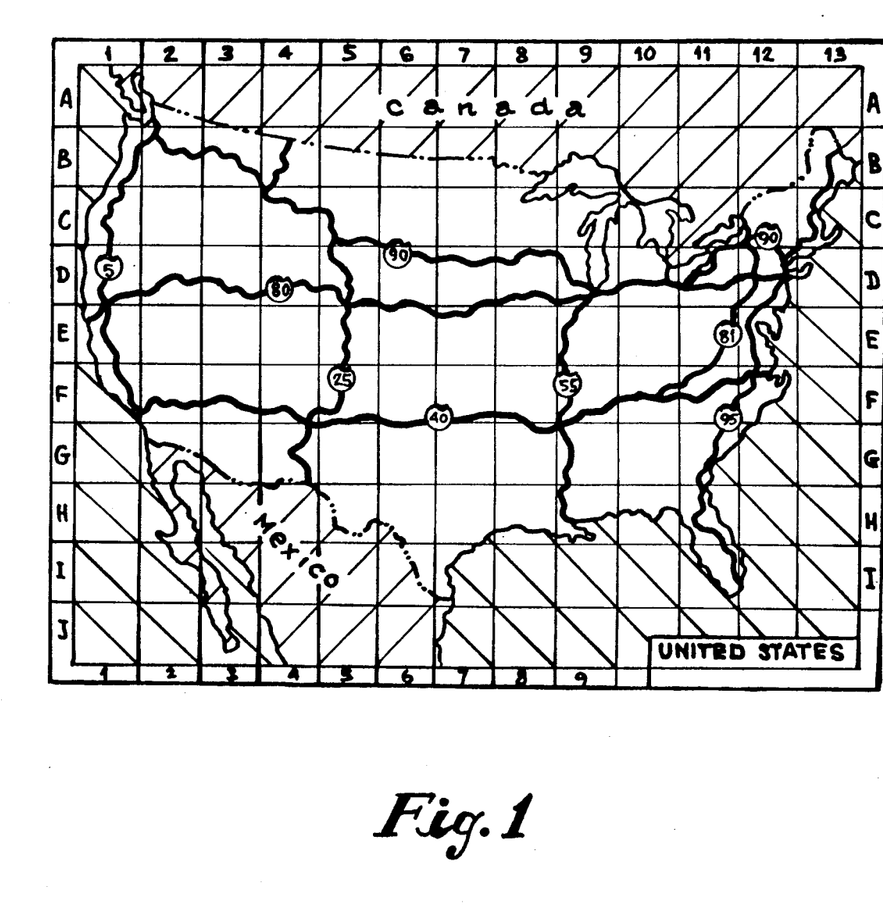
FIG. 1 illustrates a map of a geographical region (the United States of America, as an example) divided into separate zones by vertical and horizontal lines. The map is simplified by showing only a few of the interstate highways.

Referring to FIG. 1, a geographical region (countries, states, cities, etc.) being represented by the method of the invention is divided into a finite number of individual zones. Each of these zones is illustrated on a separate foldable, four panel card (see FIG. 2). This division is carried out by horizontal and vertical lines so that the total map of the chosen region (for instance, the United States of America) becomes split into square zones defined at the intersections of rows and columns. Each zone is distinquished by a unique combination of letters and numbers. Such an alphanumeric system is created by lettering the rows and numbering the columns. Of course, any other system may be incorporated as well.

Figure 2A:
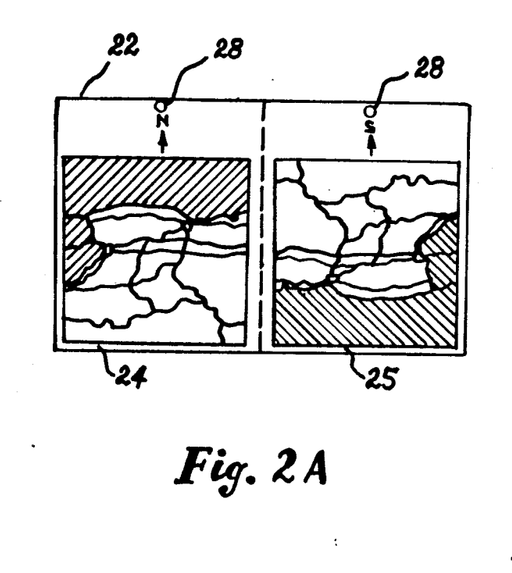
Figure 2B:
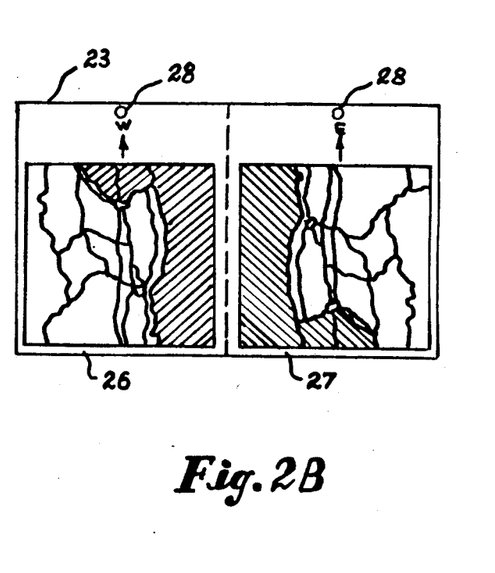
Figure 2C:
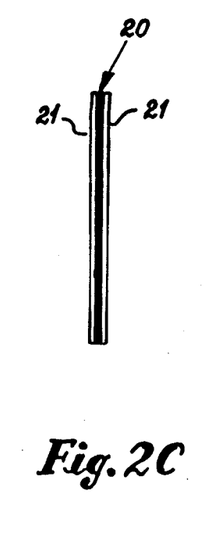

A set of four road maps referred to a separate individual region zone is represented on each card. Three views of the card are shown in FIG. 2. The middle view (FIG. 2C) indicates that cards are made from light weight cardboard 20 sandwiched between layers of two transparent plastic sheets 21. They are provided to allow marking card surfaces with erasable or washable markers. FIG. 2A shows one side 22 of the card. Its opposite side 23 is illustrated in FIG. 2B. Each side is divided into two halves so that a total of four different panels 24, 25, 26, and 27 are created. They are used to present the road map of a region zone from FIG. 1 in four separate views (see also FIGS. 3, 4, 5, and 6). The separate panels are provided to orient the top of the map in directions toward the north, the south, the west, and the east, respectively, depending upon the route selected for a trip.

Figure 7:
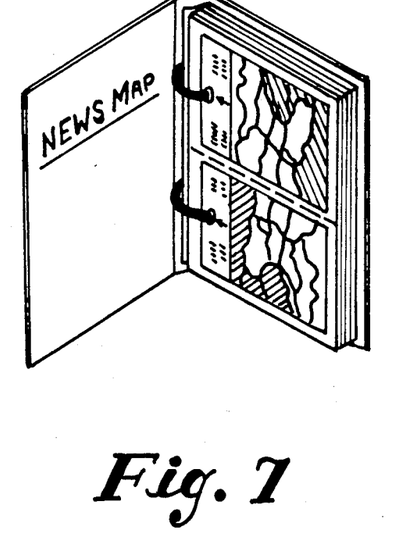
FIG. 7 is a perspective view of a ring binder where a group of cards for all of the different zones are kept together with the map from FIG. 1 as well as with any other reference material supplied with the road maps.

Two holes 28 are provided to store the cards in an appropriately sized ring binder (see also FIG. 7).

Figure 3:
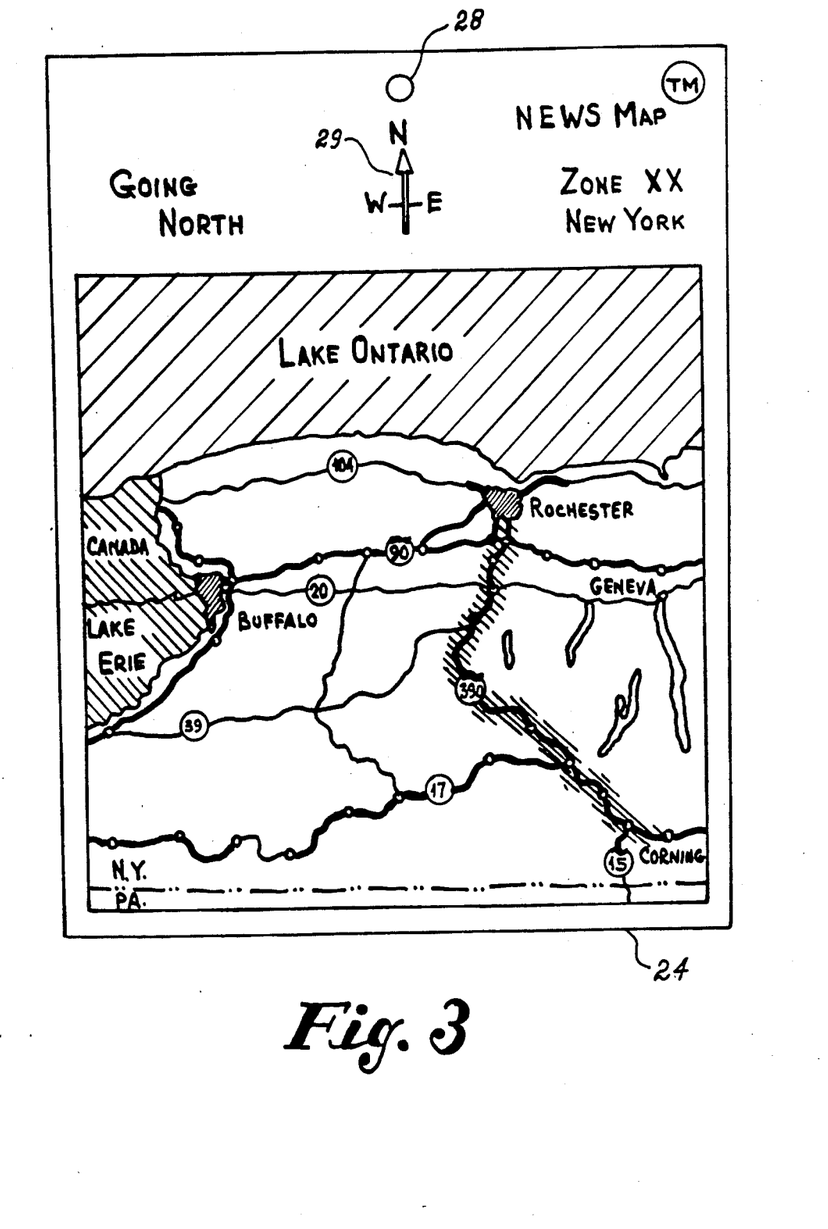
FIG. 3 is an enlarged view of one of the four portions (the left side of FIG. 2A) of the card demonstrating a road map of a region zone with the top of the map directed toward the north.
Figure 4:
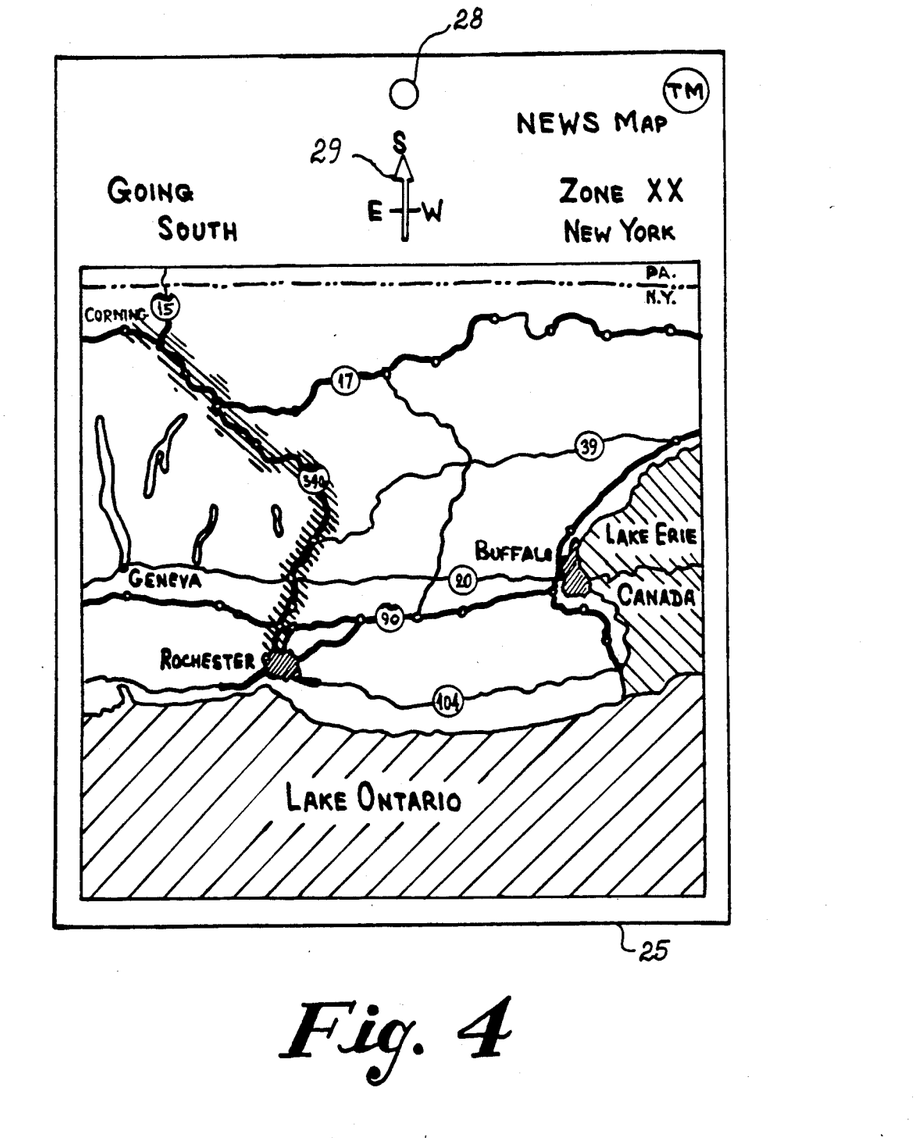
FIG. 4 is an enlarged view of the second portion (the right side of FIG. 2A) of the card showing the same road map as in FIG. 3 but turned upside down so that the top of the map is pointed toward the south.
Figure 5:
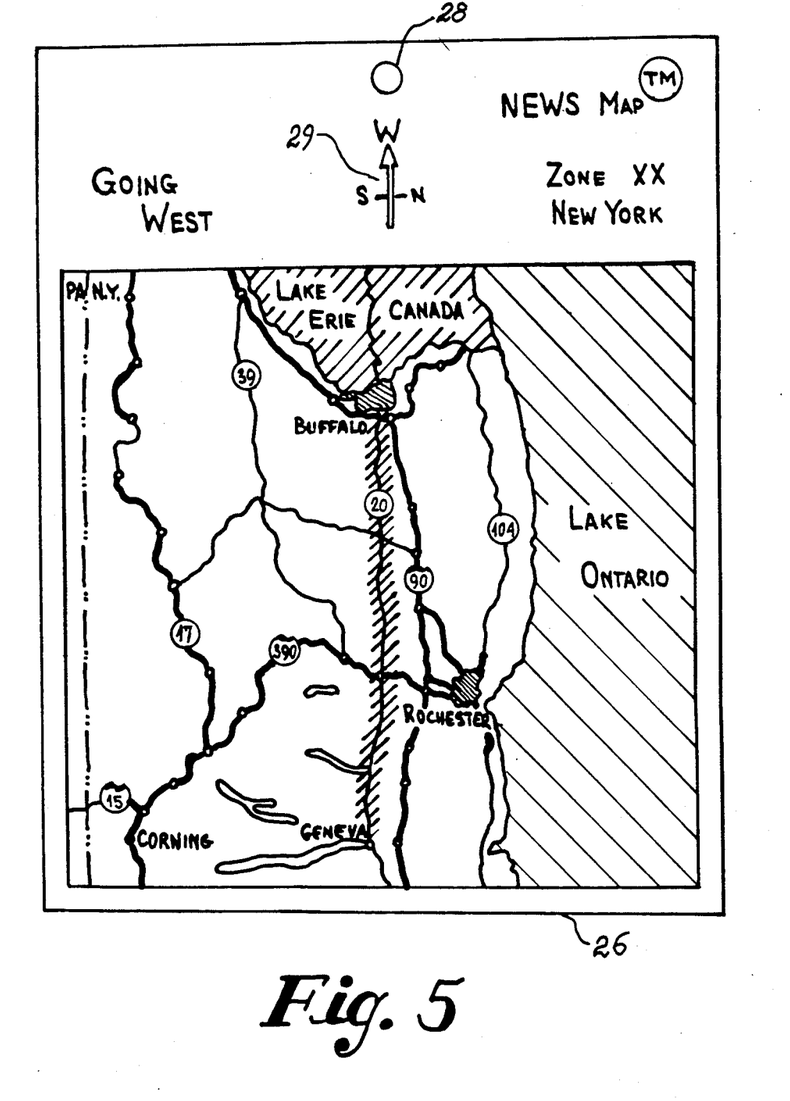
FIG. 5 illustrates an enlarged view of the third portion (the left side of FIG. 2B) of the card showing the same road as in FIG. 3 but drawn in a way so as to orient the top of the map in the direction toward the west.
Figure 6:
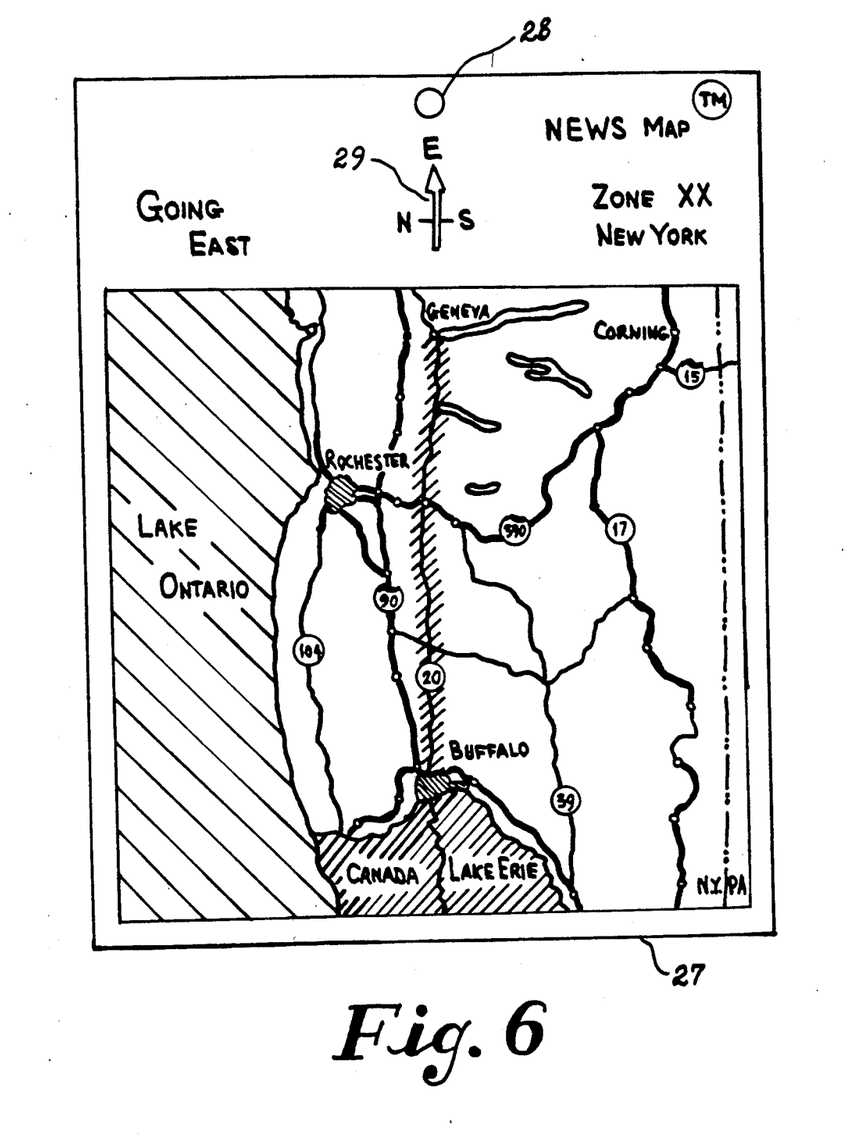
FIG. 6 is an enlarged view of the fourth portion (the right side of FIG. 2B) of the card showing the same road map as in FIG. 5 but turned upside down so that the top of the map is pointed toward the east.

Panels 24, 25, 26, and 27 of the card shown in FIG. 2 are presented separately in FIGS. 3, 4, 5, and 6, where a road map of a unique region zone is illustrated (western portion of New York State, as an example). Starting with FIG. 3, the map is laid out in a simple and recognizable fashion when the top of the map is pointed toward the north. This is provided for a case while going north since it is most natural to have the road, one is traveling along, oriented on the map in the same direction as the direction of the driver's route. Similarly, FIGS. 4, 5, and 6 represent the same road map from FIG. 2 but turned from one view to the next one so as to point the top of the map in directions toward the south, the west, and the east, respectively. Obviously, each of those panels is utilized depending upon the direction one is traveling. For instance, while going north from Corning to Rochester, N.Y., card panel from FIG. 3 is used. Since all cards are covered with a transparent plastic sheet, required routes may be marked in a distinquishing color which can be erased or washed away at the final destination. Prepared in advance, those markings provide the driver with an extremely helpful navigating tool.

By analogy, while going south from Rochester to Corning, card panel from FIG. 4 is employed. If one is going west, for example, from Geneva, N.Y. to Buffalo, card panel from FIG. 5 is utilized. Finally, for going east from Buffalo to Geneva, card panel from FIG. 6 is used.

Each card represents a road map of an individual zone providing a slight overlap with all neighboring zones of the region. Every respective card panel is designated by the orientation mark 29 and preferred direction of travel. The zone numbering and locating description is also included.

The cards are supplemented with a number of accessories. They include a ring binder from FIG. 7 where all map cards are kept in correct sequence together with the map from FIG. 1 as well as with any other reference material supplied with the road maps. Several multiple-use transparent envelopes (see FIG. 9) and a mapholding ergonomic storage box (see FIG. 10) are included as well. An erasable or washable marker may be also provided. With those accessories, the most convenient and logical way of utilization of the apparatus is assured.

Advanced trip planning starts with the map from FIG. 1 where a desirable traveling route from start to finish may be laid out. As a result, all region zones along that route will be determined. For such a step, a cross reference chart can be provided to indicate zones to be crossed while driving from one point to another (major cities, towns, etc.). The second planning step is related to assembling a finite set of map cards representing each zone to be crossed. Those cards are found in the ring binder shown in FIG. 7. Depending upon travel directions, the right card panel is chosen, and all roads along the route are traced and marked in a distinquishing color.

Figure 8:
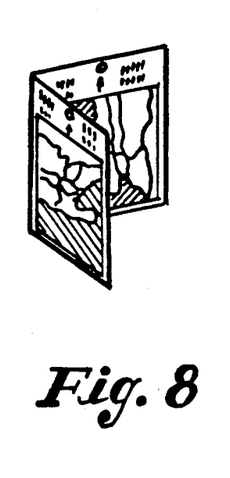
FIG. 8 is a perspective view of an individual card folded along its center line for storage and utilization during driving.
Figure 9:
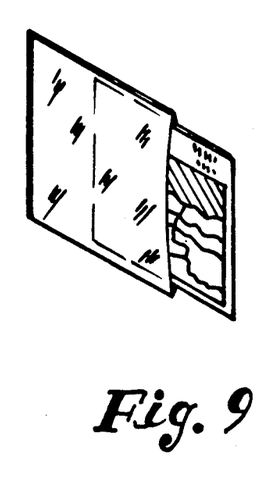
FIG. 9 is a perspective view showing a transparent envelope holding an individual card folded along its center line: the card shown in process of being inserted or removed from the envelope.
Figure 10:
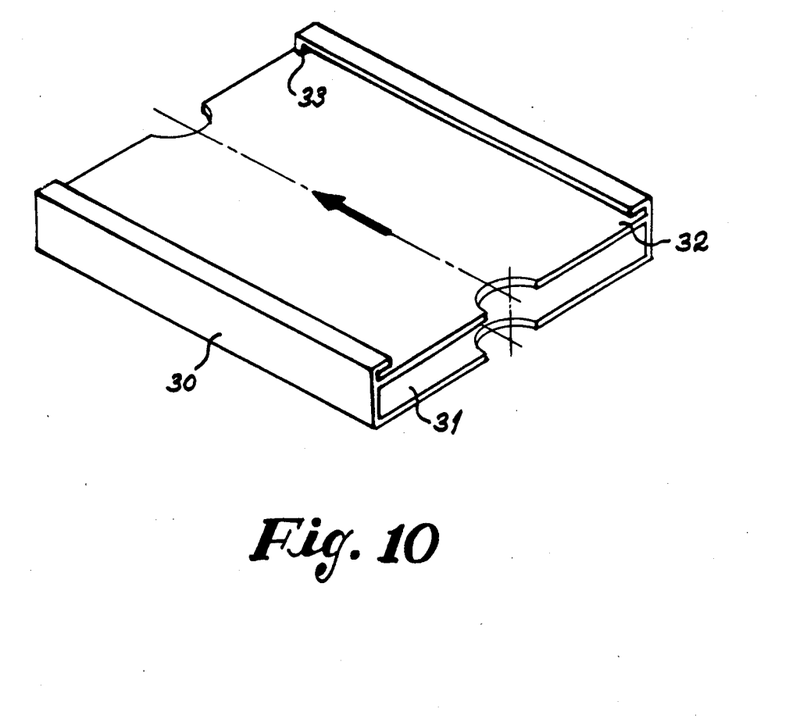
FIG. 10 is a perspective view of a mapholding storage box where a deck of cards arranged as required for the selected route of a trip are stored.

If each marked card is folded along its center line as shown in FIG. 8, the transparent plastic envelope from FIG. 9 then may be used. Each folded card is inserted into a separate transparent envelope so that the selected road map can be seen through. All cards (a deck) for a planned trip are finally put together in correct sequence and placed in a special mapholder - the storage box 30 shown in FIG. 10. This box, convenient and safe for map usage during driving, has two compartments 31 and 32. The larger one 31 at the bottom is provided to store a certain number of map cards required for the trip. The top compartment 32 is much smaller and allows to store one individual card which may be inserted in the direction of the arrow until it is stopped by two positive end stops one of which 33 is shown. Similar stops at the same end are provided in the bottom compartment 31. The top card in the compartment 32 is used as a navigating tool during driving. While approaching the end of a partial route represented on that card, it is exchanged with the next required card from the bottom compartment. Such a process continues until the whole trip is completed.

Having thus described the invention it should be apparent that many modifications within the scope of the invention can be made to the design of the cards, the accessories, as well as to the amount of information presented on the cards. The forgoing description should therefore not be taken in a limiting sense.

We claim:

1. The method of displaying the route of a trip within a preselected geographical region which region has been subdivided into a first predetermined number of discrete zones, which method comprises the steps of: selecting a second predetermined number of orientations for the zones; providing a plurality of sets of cards with the number of said cards in said plurality of sets being equal to the product of said first predetermined number and said second predetermined number and with the cards of each of said plurality of sets of cards being uniquely associated with a single one of said zones and containing said second predetermined number of cards; providing on each of said cards in each of said plurality of sets a map display representing the zone associated with the said card, with each card having its map display oriented in a different one of said selected orientations and wherein all of the indicia on each display is oriented for reading towards the same edge of the card irrespective of the orientation of the map display thereon; determining which of said zones are traversed by said route and the sequence of traversals of said zones by said route; arranging said cards into a deck with each card in sequential order as determined by said sequence of traversal; and displaying each card in succession as the trip progresses from zone to zone.

2. The method according to claim 1 further comprising the steps of arranging a pair of panels on opposite sides of a fold line to provide a card unit for each of said sets of cards, and folding said card unit to present the selected one of the panels for the selected route.

3. The method according to claim 2 further comprising the step of placing the folded card units with the selected one of the panels exposed into a transparent envelope.

4. The method according to claim 2 further comprising the step of covering the cards with an erasable transparent medium, and marking the route on the selected panel on the erasable medium.

5. The method according to claim 2 further comprising the steps of inserting the deck of card units folded to expose the selected one of the panels of each unit into an open ended storage box having a viewing compartment on one side thereof, and placing said cards successively in said viewing compartment as the trip progresses from zone to zone.

6. The method according to claim 1 further comprising the step of arranging a map of the entire region and each of the cards in order as the loose leaves of a notebook.

7. The method according to claim 1 wherein the second predetermined number is four and said selected orientations of the four cards in a set are north, east, west and south, respectively.

8. Map display apparatus to facilitate travel along a preselected route within a defined geograhical region which region has been subdivided into a predetermined number of zones, which apparatus comprises a plurality of cards wherein there is provided a set of cards for each of said zones, each card containing a map display representing the zone associated with said card, with each card in the set having its map display in a different orientation with respect to a reference edge of said card but with all of the indicia on each card in the set being oriented for reading in the same way with respect to said reference edge of said card, whereby selected cards of each set can be disposed successively in a deck along said preselected route of travel.

9. The apparatus according to claim 8 wherein four different displays are provided in each set for the orientation of the same zone oriented north, south, west and east.

10. The apparatus according to claim 9 wherein each card set is provided by a card having a central fold, the first pair of said four different displays being disposed in separate panels on one of the opposite sides of said card, the second pair of said four different displays being disposed in separate panels on the other of the opposite sides of said card on opposite sides of said fold.

11. The apparatus according to claim 10 wherein said panels are covered by an erasable transparent covering adopted to receive markings of a selected route on the maps displayed on said panels.

12. The apparatus according to claim 10 further comprising transparent envelopes into which said folded cards are insertable with a selected one of said panels exposed.

13. The apparatus according to claim 10 further comprising a storage box having an open ended compartment for receiving said cards folded and stacked in order to display said route on successive ones of the panels exposed on one side of said folded cards, said box also having on the top thereof means for receiving and removably retaining selected ones of said folded cards with the selected panel thereof visible.

* * * * *